US006217056B1

(12) United States Patent
Tsuchie

(10) Patent No.: US 6,217,056 B1
(45) Date of Patent: Apr. 17, 2001

(54) WALKING AID

(76) Inventor: Kimihiro Tsuchie, 35-1, Kinugasa, Tenjinmori-cho, Kita-ku, Kyoto-shi (JP)

(*) Notice: Subject to any disclaimer, the term of this patent is extended or adjusted under 35 U.S.C. 154(b) by 0 days.

(21) Appl. No.: 09/419,154

(22) Filed: Oct. 15, 1999

(30) Foreign Application Priority Data

Oct. 27, 1998 (JP) .......... 10-344847

(51) Int. Cl.[7] .......... A45B 1/00; B62B 3/00

(52) U.S. Cl. .......... 280/639; 280/641; 135/65; 135/74; 135/85

(58) Field of Search .......... 280/638, 639, 280/40, 645, 42, 652, 654, 655, 655.1, 87.021, 47.1, 47.11, 47.12, 47.17, 47.19, 47.33, 47.34, 47.35, 63, 649, 647; 135/65, 66, 67, 74, 84, 85; 403/117, 113

(56) References Cited

U.S. PATENT DOCUMENTS

| | | | | |
|---|---|---|---|---|
| 1,527,239 | * | 2/1925 | Vaughan | 135/82 |
| 2,249,123 | * | 7/1941 | Fleck | 280/41 |
| 2,485,085 | * | 10/1949 | Burch | 280/56 |
| 2,590,052 | * | 3/1952 | Stuits | 135/82 |
| 2,873,820 | * | 2/1959 | Rizzuto | 188/20 |
| 3,999,771 | * | 12/1976 | Lohr | 280/1.13 |
| 4,294,464 | * | 10/1981 | Ettridge | 280/649 |
| 4,341,381 | * | 7/1982 | Norberg | 482/67 |
| 4,722,538 | * | 2/1988 | Freyman | 280/5.32 |
| 4,941,496 | * | 7/1990 | Berning | 135/67 |
| 4,958,651 | * | 9/1990 | Najm | 135/82 |
| 4,962,781 | * | 10/1990 | Kanbar | 135/65 |
| 5,188,138 | * | 2/1993 | Yamasaki et al. | 135/65 |
| 5,538,268 | * | 7/1996 | Miller | 280/87.05 |
| 5,603,517 | * | 2/1997 | Lorman | 280/5.2 |
| 5,788,260 | * | 8/1998 | Huang | 280/645 |
| 6,050,642 | * | 4/2000 | Erb | 297/322 |

* cited by examiner

*Primary Examiner*—Brian L. Johnson
*Assistant Examiner*—Bridget Avery
(74) *Attorney, Agent, or Firm*—Koda & Androlia

(57) ABSTRACT

The walking aid includes a stick body inclined in the forward-and-backward direction so that the lower end thereof is positioned forward, a support rod installed behind the stick body and inclined so that lower end thereof is positioned backward, and wheels provided on both sides of the lower end of the stick body and on both sides of the lower end of the support rod, steering being carried out by turning the stick body, wherein a rocking mechanism is provided at the wheel installation portion of the stick body to support an axle rotatably with respect to its axis in the forward-and-backward direction. With this kind of structure, even when the stick body is tilted or steered, the axle rocks automatically so that the wheels on both sides remain contact with the ground at all times, whereby it is possible to obtain a stable, easy-to-use walking aid.

3 Claims, 3 Drawing Sheets

WALKING AID

BACKGROUND OF THE INVENTION

1. Field of the Invention

The present invention relates to an improvement in a walking aid provided with wheels at the lower end of a stick.

2. Description of the Prior Art

A walking aid is known, comprising a stick body inclined in the forward-and-backward direction so that its lower end is positioned forward, a support rod installed so as to be branched from behind the stick body and inclined so that its lower end is positioned backward, and wheels provided on both sides of the lower end of the stick body and on both sides of the lower end of the support rod, steering being carried out by turning the stick body (refer to Japanese Laid-open Utility Model Application No. Sho 64-14019, for example).

In the case of the above-mentioned walking aid, the axle of the wheels of the stick body is secured to the stick body. Therefore, when the stick body tilts right or left, one of the wheels floats, and the stability of the stick body is Impaired. Furthermore, when the stick body is turned to perform steering operation, the inner wheel on the turning side is lowered, and the outer wheel is raised, since the stick body is inclined in the forward-and-backward direction. For this reason, when the steering operation is performed while the walking aid stands upright, the outer wheel floats. If the entire walking aid is tilted outward at this time, the outer wheel can make contact with the ground. However, in either case, the stability of the walking aid in the right-and-left direction is impaired, whereby the walking aid becomes difficult to use and unstable. In particular, tilting the walking aid outward is an unnatural action causing anxiety for the user. In addition, the stick body mainly has the walking aid function of the stick, and the support rod is used as an auxiliary member. Therefore, the ground contact conditions of the wheels on the support rod side have little effect on the above-mentioned stability.

SUMMARY OF THE INVENTION

Accordingly, an object of the present invention is to provide a walking aid being stable and easy to use, without causing a problem of floating of the right and left wheels even when the stick body is tilted or steered.

In order to attain the above-mentioned object, the walking aid of the present invention comprises a stick body inclined in the forward-and-backward direction so that its lower end is positioned forward, a support rod installed so as to be branched from behind the stick body and inclined so that its lower end is positioned backward, and wheels provided on both sides of the lower end of the stick body and on both sides of the lower end of the support rod, steering being carried out by turning the stick body, wherein an axle installed at the lower end of the stick body and provided with the wheels on both sides thereof is supported rotatably with respect to its axis in the forward-and-backward direction. Therefore, even when the stick body is tilted or steered, the axle rocks automatically so that the wheels on both sides remain contact with the ground at all times, thereby not causing instability.

The specific structures of the walking aid in accordance with the present invention will be made clear by the explanations regarding embodiments described below.

DETAILED DESCRIPTION OF THE PREFERRED EMBODIMENTS

Figure 1:
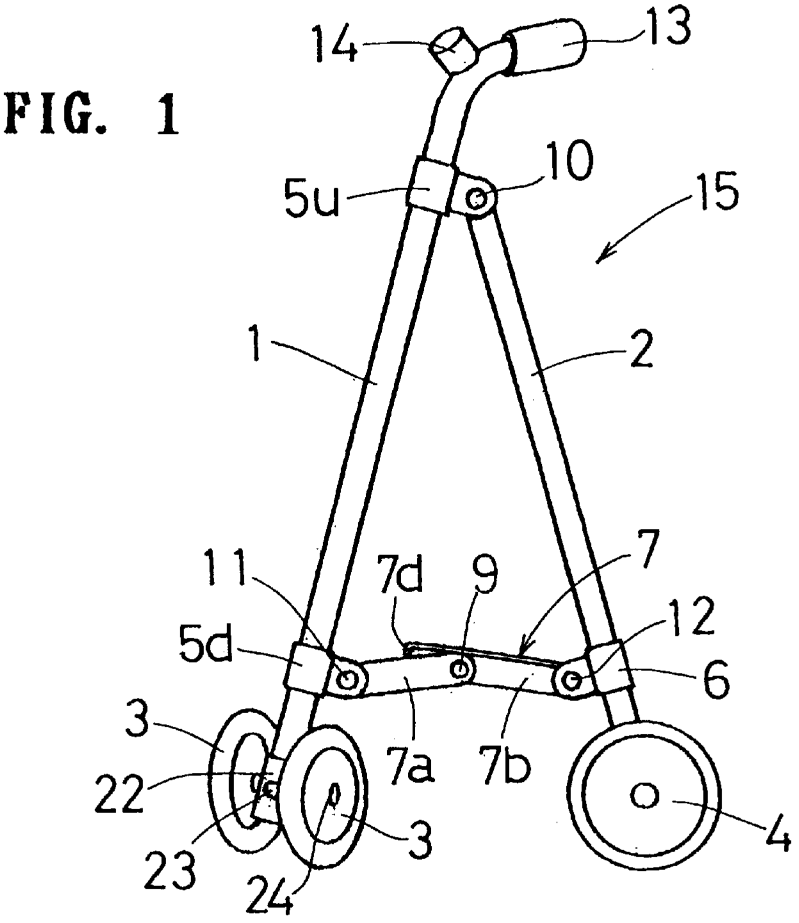
FIG. 1 is a side view showing an embodiment of the walking aid of the present invention.

In FIG. 1, the numeral 1 represents a stick body inclined in the forward-and-backward direction so that its lower end is positioned forward, the numeral 2 represents a support rod installed so as to be branched from behind the stick body 1 and inclined so that its lower end is positioned backward, the numeral 3 represents front wheels disposed on both the right and left sides of the lower end of the stick body 1, and the numeral 4 represents rear wheels disposed on both the right and left sides of the lower end of the support rod 2. The numerals **5*u* and 5*d* represent brackets disposed at the upper and lower portions of the stick body 1, respectively, the numeral 6 represents a bracket secured to the lower portion of the support rod 2, and the numeral 7 represents a link formed of two members 7*a* and 7*b* connected with a pin shaft 9. The upper end of the support rod 2 is rotatably connected to the bracket 5*u* with a pin shaft 10, whereby the support rod 2 can be folded and unfolded with respect to the stick body 1, and the link 7 is disposed between the bracket 5*d* and the bracket 6 and connected thereto with pin shafts 11 and 12. Therefore, as a whole, a triangle, extending upward, is formed of the stick body 1, the support rod 2 and the link 7. By moving the portion around the pin shaft 9 upward so as to fold the link 7 in the reverse V-shape, the support rod 2 can be folded to the position wherein the support rod 2 becomes nearly parallel with the stick body 1**.

The numeral 13 represents a grip disposed at the upper end of the stick body 1, and the numeral 14 represents a hook. The user holds the grip 13 with a hand, and moves as the wheels 3 and 4 rotate. The stick body 1 is made rotatable with respect to the brackets **5*u* and 5*d*. By turning the stick body 1 right and left, steering can be carried out. The stick body 1 shown in FIG. 1 is turned left. The numeral 15** represents a walking aid having the above-mentioned structure.

Figure 2:
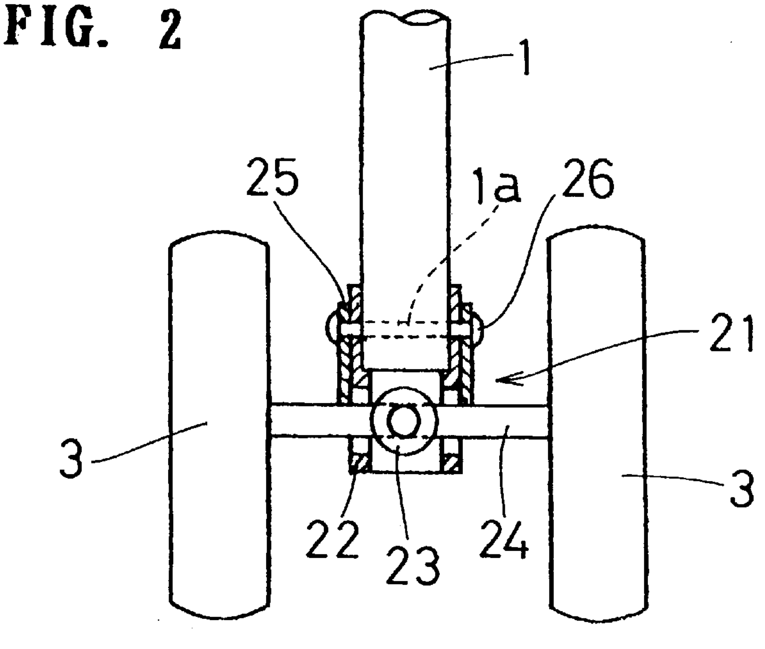
FIG. 2 is a partially cut-away front view showing the rocking mechanism of the walking aid.

A rocking mechanism 21 is disposed at the installation portion of the front wheels 3. In FIG. 2 and the following figures, the numeral 22 represents a cylinder, the numeral 23 represents a rocking shaft, the numeral 24 represents an axle, the numeral 25 represents a rocking stopper, and the numeral 26 represents a fixture pin.

Figure 4:
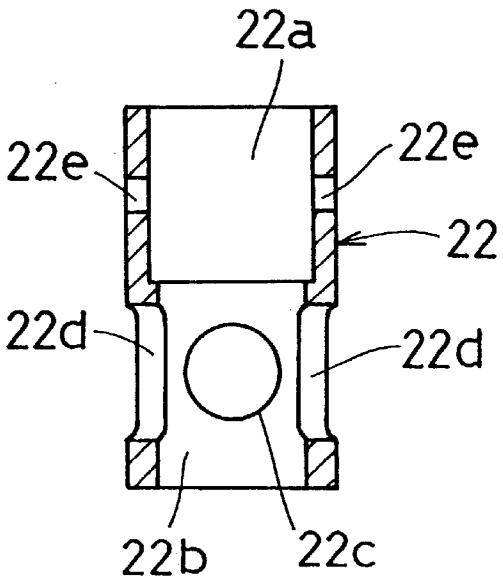
FIG. 4 is a vertical sectional front view showing the cylinder of the rocking mechanism.
Figure 5:
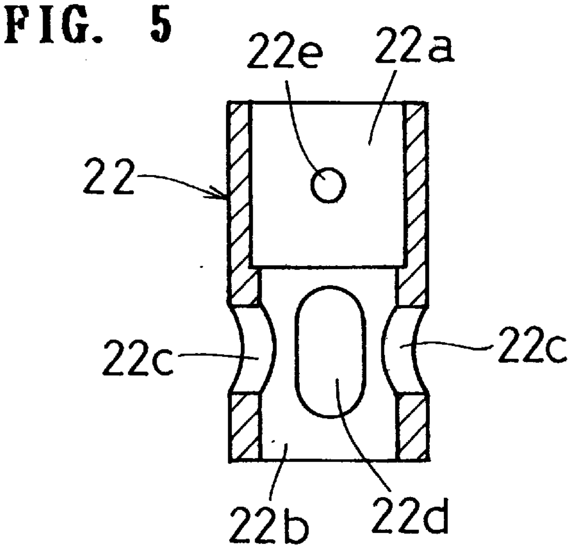
FIG. 5 is a vertical sectional side view showing the cylinder.
Figure 6:
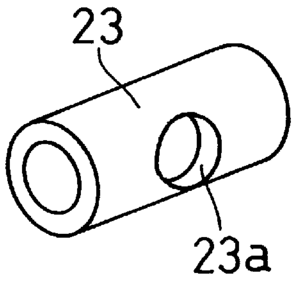
FIG. 6 is a perspective view showing the rocking shaft of the rocking mechanism.

As shown in FIGS. 4 and 5, the inner upper portion of the cylinder 22 is a large-diameter portion **22*a*, and the inner lower portion thereof is a small-diameter portion 22*b*. The large-diameter portion 22*a* has a size into which the stick body 1 can be fitted. A pair of rocking shaft support holes 22*c* passing crosswise through the small-diameter portion 22*b* and a pair of axle insertion holes 22*d* also passing crosswise therethrough are formed so as to be perpendicular to each other in the small-diameter portion 22*b*. The support holes 22c are round holes having a diameter aligned to the outer diameter of the rocking shaft 23. The insertion holes 22d are slot holes extending vertically, and the short diameter of the insertion hole 22d is slightly larger than the outer diameter of the axle 24. As shown in FIG. 6, at the center of the rocking shaft 23, an axle hole 23a is disposed so as to pass through the rocking shaft 23 in a direction perpendicular to the longitudinal direction of the rocking shaft 23**.

At the time of assembly, first, the lower end of the stick body 1 is inserted into the large-diameter portion 22a of the cylinder 22 until it makes contact with the small-diameter portion 22b. At this time, the orientation of the cylinder 22 is selected so that the axle insertion holes 22d are directed in the right-and-left direction of the stick body 1. The stick body 1 is secured by using fixture holes 22e formed in the large-diameter portion 22a and the fixture pin 26 passing through a through hole 1a formed in the stick body 1 in the right-and-left direction so as to be aligned with the fixture holes 22e. This pin 26 is also used to install the rocking stopper 25 as described later.

Next, the rocking shaft 23 is inserted into the support holes 22c of the cylinder 22. The axle 24 is passed through the axle insertion holes 22d and the axle holes 23a so that both ends of the axle 24 evenly project on both sides of the stick body 1. The wheels 3 and 3 are then secured to both ends of the axle 24. As a result, the rocking shaft 23 can rock freely in the range wherein the axle 24 is restricted by the axle insertion holes 22d. Therefore, the axle 24 of the front wheels 3 is supported rotatably with respect to its axis in the forward-and-backward direction. Even when the stick body 1 is tilted or steered, the axle 24 rocks automatically so that the wheels 3 and 3 on both sides remain in contact with the ground at all times. This does not cause instability due to floating of one of the wheels, whereby it is possible to obtain a stable, easy-to-use walking aid 15.

The above-mentioned embodiment is an example of a rocking mechanism for rotatably supporting an axle with respect to its axis in the forward-and-backward direction. It is thus possible to use mechanisms having other appropriate structures.

Figure 3:
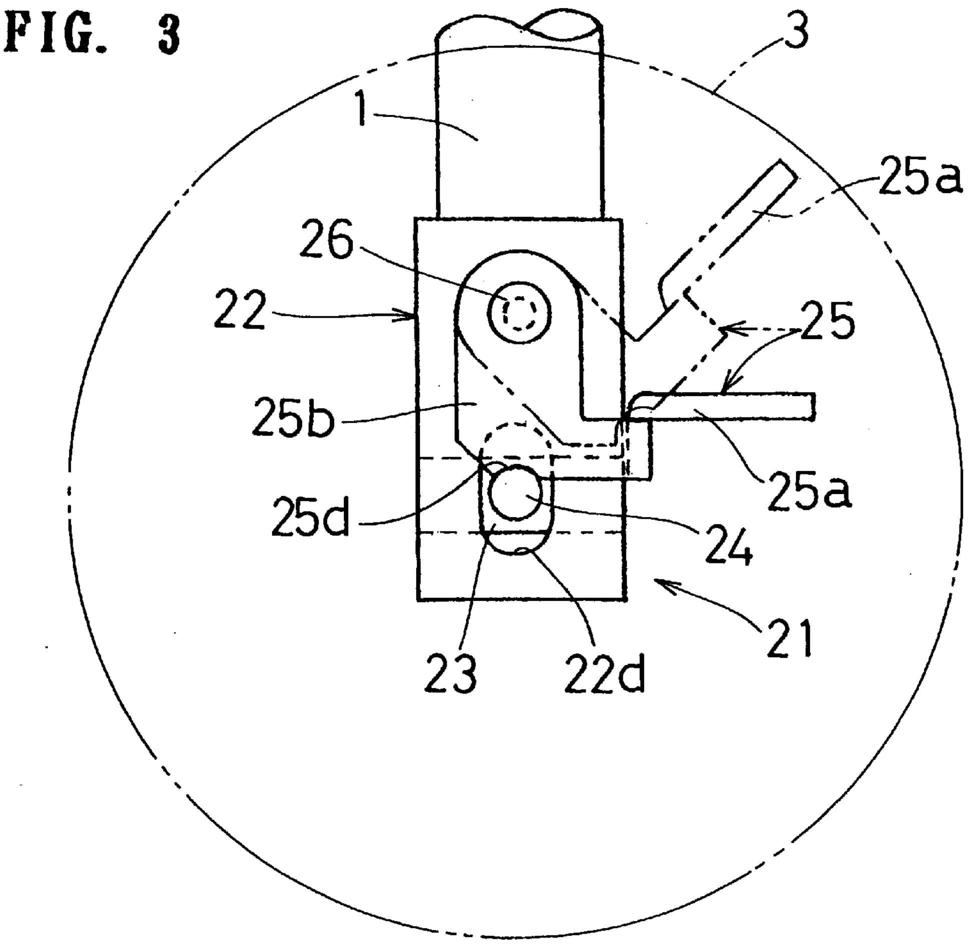
FIG. 3 is a side view showing the rocking mechanism.
Figure 7:
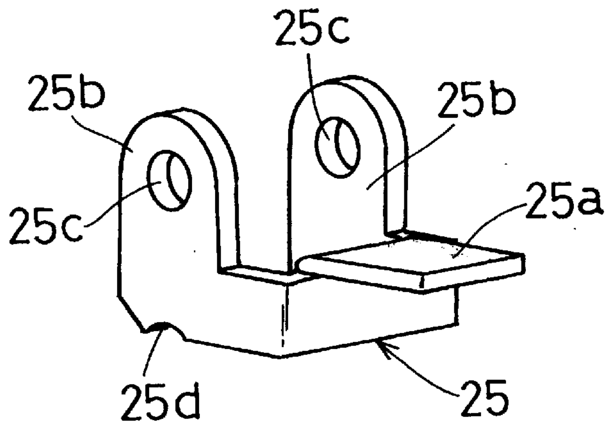
FIG. 7 is a perspective view showing the rocking stopper of the rocking mechanism.

In the case when baggage is hung on the hook 14 of the stick body 1, or when the walking aid 15 is desired to remain standing upright, for example, the rocking function can be stopped by using the rocking stopper 25. In other words, as shown in FIG. 7, the rocking stopper 25 is provided with an operation lever 25a and a pair of installation pieces 25b disposed on both sides of the lever 25a so as to hold the cylinder 22 therebetween. The installation piece 25b is provided with a fixture hole 25c, and a dent portion 25d for holding the axle is formed at the lower fringe of the installation piece 25b. This rocking stopper 25 is rotatably installed on the stick body 1 by using the fixture pin 26 inserted through the holes 25c as shown in FIG. 2. When the operation lever 25a is pushed down as shown in solid lines in FIG. 3, the dent portion 25d makes contact with the axle 24. Therefore, the axle 24 is stopped from moving in the vertical direction, and cannot rock. On the other hand, when the operation lever 25a is pushed up as shown in chain lines, the axle 24 is released from the dent portion 25d, and can rock. As a result, even when the user has baggage, he can hang it on the stick body 1, and can walk while being supported by the walking aid 15. In this respect, it is also possible to obtain an easy-to-use walking aid.

The above-mentioned embodiment is an example of a structure for temporarily stopping the rocking function. It is thus possible to use other appropriate structures.

Figure 8:
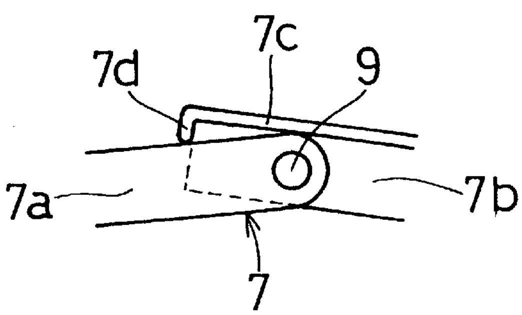
FIG. 8 is a side view showing the main portions of the link of the walking aid.

The walking aid 15 of the present invention is used while the support rod 2 is unfolded backward as shown in FIG. 1. In the case when the walking aid 15 is not used or in other cases, the support rod 2 can be folded by bending the link 7 in the reverse V-shape. In the present invention, the link 7 is improved to enhance usability. FIG. 8 shows an example of the structure.

In other words, the upper fringe 7c of the member 7b is bent toward the member 7a, and a projection 7d for angular adjustment is formed at the end of the upper fringe 7c. With this structure, even when the support rod 2 is unfolded, the projection 7d makes contact with the upper fringe of the member 7a, and the link 7 is not made completely straight, but remains in a gently-sloped reverse V-shape with the portion of the pin shaft 9 raised slightly. For this reason, in the present invention, it is not necessary to use a spring to fold the support rod 2. When all the wheels 3 and 4, or the wheels 3 or 4 are detached from the ground by lifting the stick body 1 or by tilting it forward or backward, a force pushing the portion of the pin shaft 9 upward is applied because of the weights of the portions detached from the ground, whereby the support rod 2 is folded spontaneously.

However, if the height of the reverse V-shape is set too high, the support rod 2 is folded unintentionally even when the wheels are detached slightly from the ground. This makes the walking aid difficult to use, and makes the user feel restless, and causes an adverse mental effect. To solve this problem, the structure is designed so that the support rod 2 is not folded immediately after the wheels are detached from the ground, and so that the support rod 2 is folded only when the support rod 2, the link 7 and the like are slightly tapped in the folding direction. This can be achieved by properly selecting the size of the projection 7d in consideration of the balance among the weights of the components and the friction at the shaft portions. As a result, an easy-to-use walking aid can be obtained by using a simple mechanism. This feature cannot be achieved by a structure using a spring for folding.

The above-mentioned embodiment is an example of a mechanism for maintaining the link 7 in a gently-sloped reverse V-shape. It is thus possible to use other appropriate structures.

What is claimed is:

1. A walking aid comprising a stick body inclined in the forward-and backward direction so that the lower end thereof is positioned forward, a support rod installed so as to be branched from behind said stick body and inclined so that the lower end thereof is positioned backward, a pair of wheels provided one on each side of said lower end of said stick body and a pair of wheels on each side of said lower end of said support rod, and a rocking mechanism provided at the wheel installation portion of said stick body to support an axle of said pair of wheels of said stick body rotatably allowing the axle to move about a non-vertical axis with respect to the axis thereof in the forward-and-backward direction whereby steering is carried out by turning said stick body.

2. A walking aid in accordance with claim 1, further comprising a rocking stopper for temporarily stopping the function of said rocking mechanism.

3. A walking aid in accordance with claim 1 or 2, wherein said lower end of said stick body is connected to said lower end of said support rod foldably connected to said stick body by using a link comprising two members connected at the central connection portion thereof, and a mechanism is provided to maintain said link in a gently-sloped reverse V-shape with the central connection portion of said link raised slightly while said support rod is unfolded.

* * * * *